United States Patent [19]

Anderson

[11] Patent Number: 5,263,314
[45] Date of Patent: Nov. 23, 1993

[54] FUEL LEAKAGE PROTECTION SYSTEM FOR GAS TURBINE ENGINE

[75] Inventor: Roger E. Anderson, Indianapolis, Ind.

[73] Assignee: General Motors Corporation, Detroit, Mich.

[21] Appl. No.: 952,424

[22] Filed: Sep. 28, 1992

[51] Int. Cl.⁵ .............................................. F02G 3/00
[52] U.S. Cl. ................................... 60/39.094; 60/739; 137/312; 239/121; 239/550
[58] Field of Search .................... 60/39.094, 739, 734, 60/740, 39.32; 137/312; 239/120, 121, 550, 600

[56] References Cited

U.S. PATENT DOCUMENTS

| | | | |
|---|---|---|---|
| 4,467,610 | 8/1984 | Pearson | 60/739 |
| 4,708,371 | 11/1987 | Elsworth | 60/739 |
| 4,862,693 | 9/1989 | Batakis | 60/739 |

OTHER PUBLICATIONS

P. 2-342 from unknown publication which page was known to applicant prior to invention claimed in this application. This document is believed to illustrate a fuel draining system over which applicant's invention is an improvement.

Primary Examiner—Richard A. Bertsch
Assistant Examiner—W. T. Wicker
Attorney, Agent, or Firm—Saul Schwartz

[57] ABSTRACT

A fuel leakage protection system is disclosed for a gas turbine engine having a fuel system that has a plurality of fuel nozzles that are spaced around a combustor section, a plurality of fuel tubes that are connected to the fuel nozzles individually, two generally semi-circular fuel manifolds that are located aft of the fuel nozzles and that ar connected to the fuel tubes and a branch manifold that is connected to the fuel manifolds.

The fuel leakage protection system comprises a collar assembly encapsulating each fuel supply fitting connecting a fuel tube to a fuel nozzle or the branch manifold to a fuel manifold to trap leakage fuel. A fuel collection manifold collects leakage fuel from the collar assemblies via a plurality of fuel return tubes that are connected to the manifold at one end and fluidly connected to the collar assemblies at the other end. The fuel collection manifold also has a fitting that fluidly connects the fuel collection manifold to an evacuation line that leads to a collector that is located remote from the combustor section.

4 Claims, 6 Drawing Sheets

FUEL LEAKAGE PROTECTION SYSTEM FOR GAS TURBINE ENGINE

BACKGROUND OF THE INVENTION

This invention relates generally to gas turbine engines and more particularly to fuel systems for gas turbine engines.

Fuel systems for gas turbine engines generally comprise a number of fuel delivery tubes and components that must be connected together by fuel fittings that are located near the hot portions of the combustor section of a ga turbine engine. Since fuel is delivered under considerable pressure any fuel leakage is likely to occur at these fuel fittings which are necessarily located in a hostile environment from a fuel leakage perspective.

SUMMARY OF THE INVENTION

The object of this invention is to provide a fuel leakage protection system that collects any fuel leakage from fuel fittings located near hot portions of the combustor and evacuates the fuel leakage to a remote location for disposal in a cooler environment.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
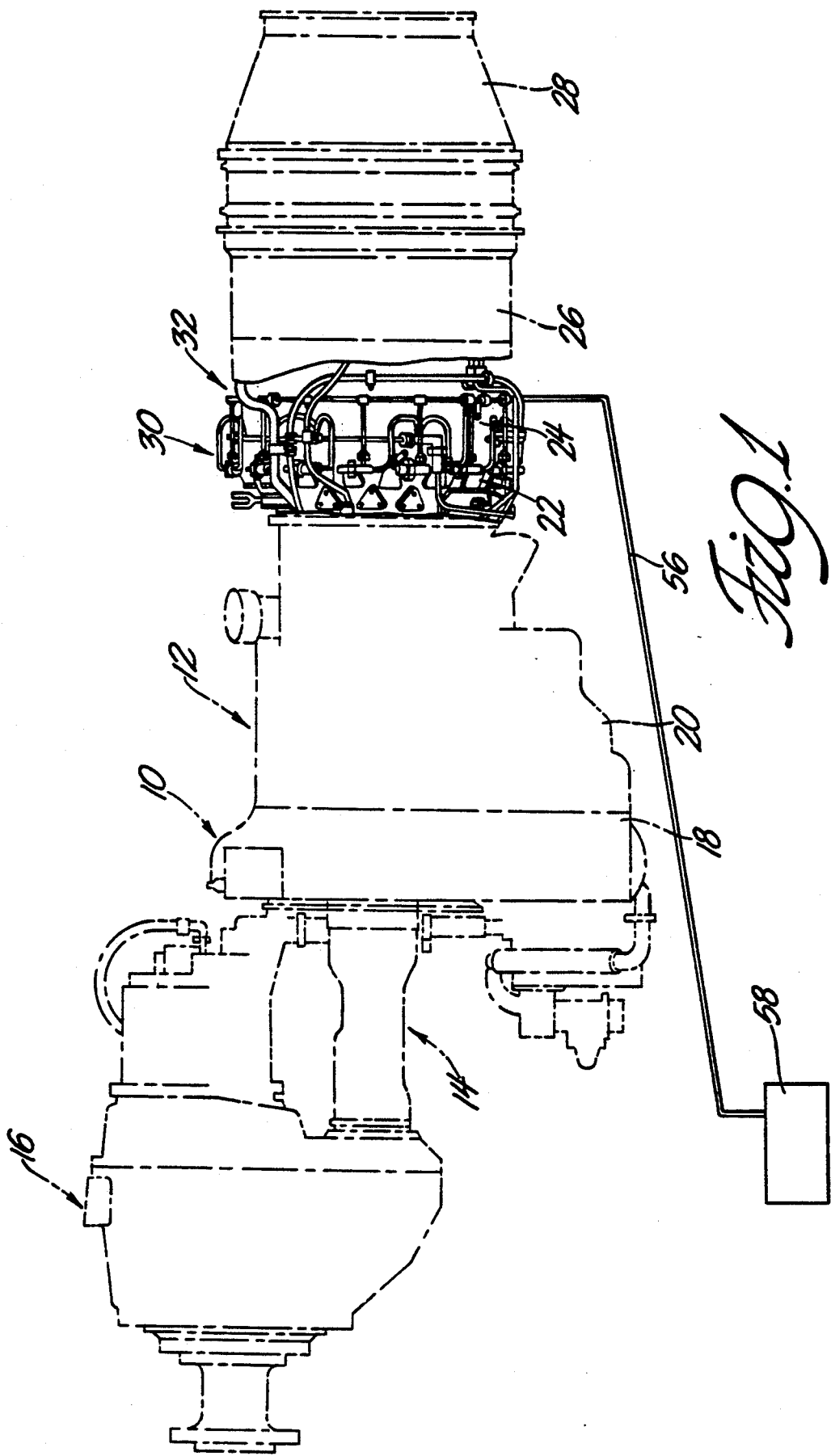
FIG. 1 is a side view of a turboprop gas turbine engine that is equipped with a fuel leakage protection system in accordance with the invention.

Referring now to the drawing, FIG. 1 shows a representative turboprop gas turbine engine assembly 10 that comprises a gas turbine engine 12 that drives a power shaft 14 that drives a reduction gear box 16 that drives a propeller (not shown). The gas turbine engine 10 comprises a inlet section 18, an axial compressor section 20, a diffuser section 22, a combustor section 24, a turbine section 26 and an exhaust section 28.

The gas turbine engine 10 has a fuel supply system 30 for supplying fuel to an annular combustor (not shown) in the combustor section 24 and a fuel leakage protection system 32 for evacuating fuel leakage of the fuel supply system 30 in the vicinity of the hot combustor section 24 to a remote disposal location. The fuel supply system 30 and the fuel leakage protection system 32 are shown in solid lines in FIG. 1. The rest of the turboprop gas turbine engine assembly 10 is shown in phantom and many components are omitted for clarity in many of the figures. Hence these omissions enhance rather than hinder an understanding of the invention.

Figure 2:
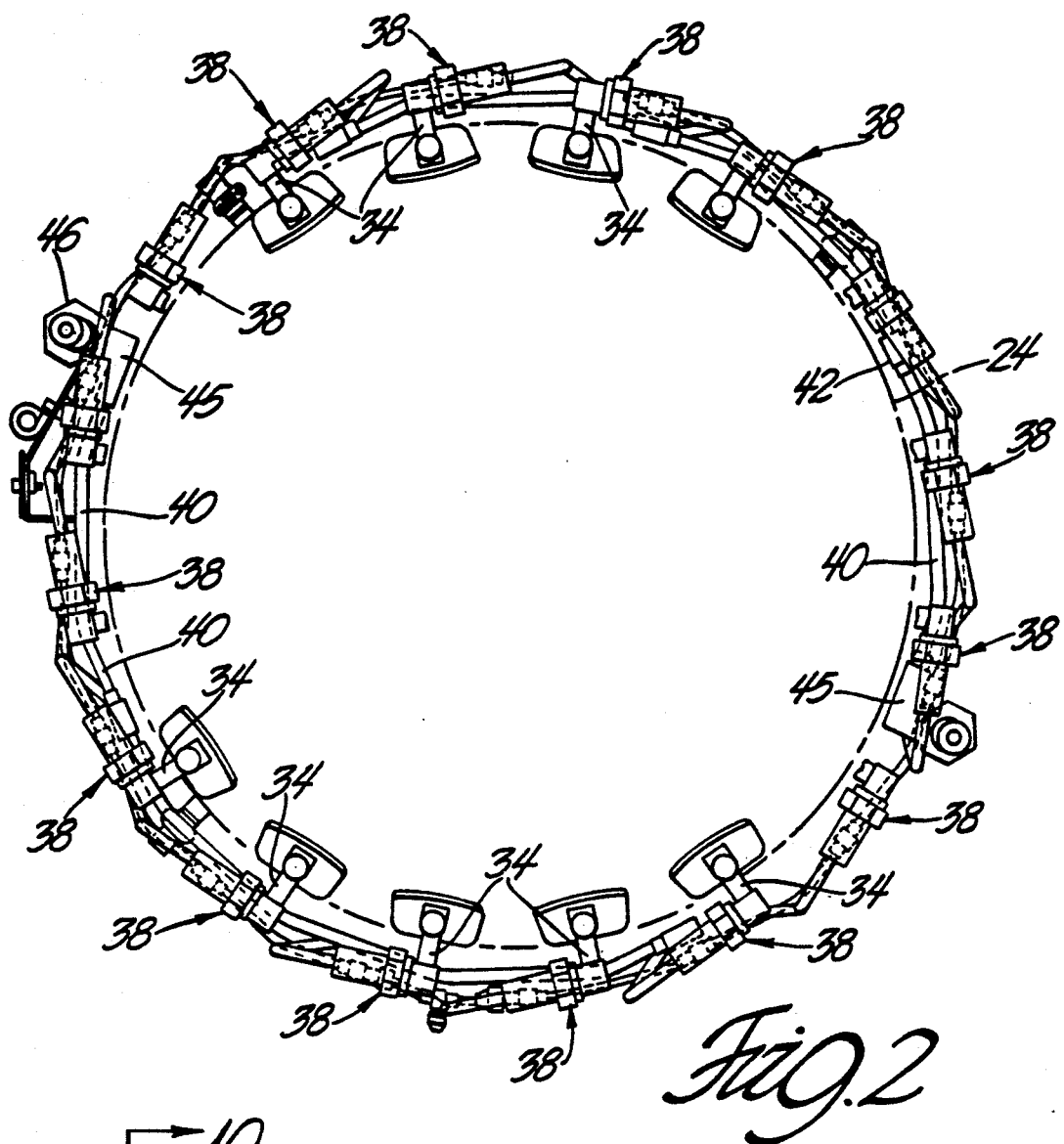
FIG. 2 is front view of the fuel leakage protection system shown in FIG. 1.
Figure 3:
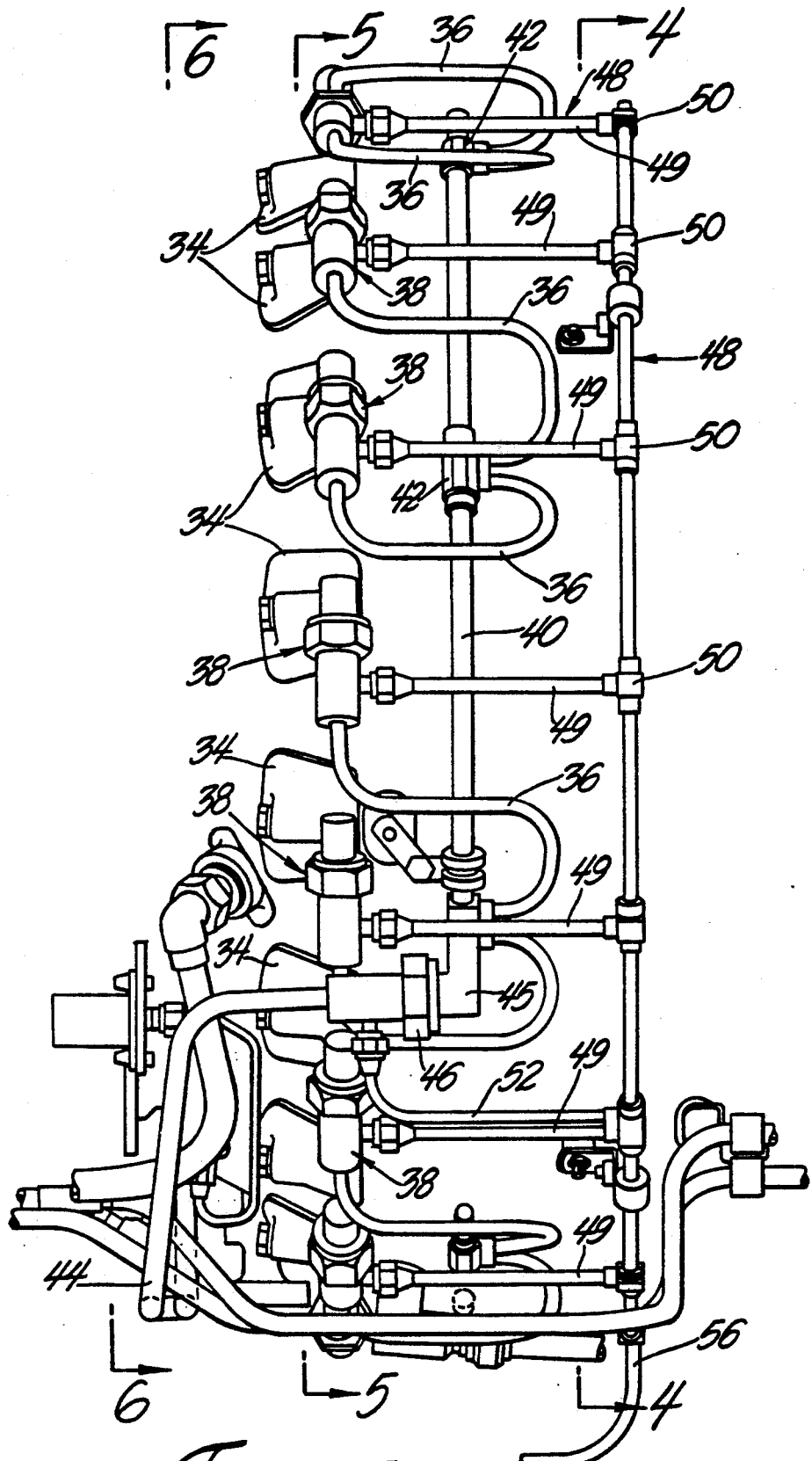
FIG. 3 is an enlarged side view of the fuel leakage protection system shown in FIG. 1.

The fuel system 30 comprises a plurality of circumferentially spaced fuel nozzles 34 that are equally circumferentially spaced around the combustor section 24 as shown in FIGS. 1, 2 and 3. Each fuel nozzle 34 receives fuel from an individual fuel tube 36 and delivers this fuel through its fuel tip to the annular combustor inside the combustor section 24 in a conventional manner well known to those skilled in the art. The end of each fuel tube 36 and the end of the nozzle 34 that it is connected to are both disposed in a collar assembly 38. These collar assemblies 38 are part of the fuel leakage protection system 32 that is described in detail later.

Figure 5:
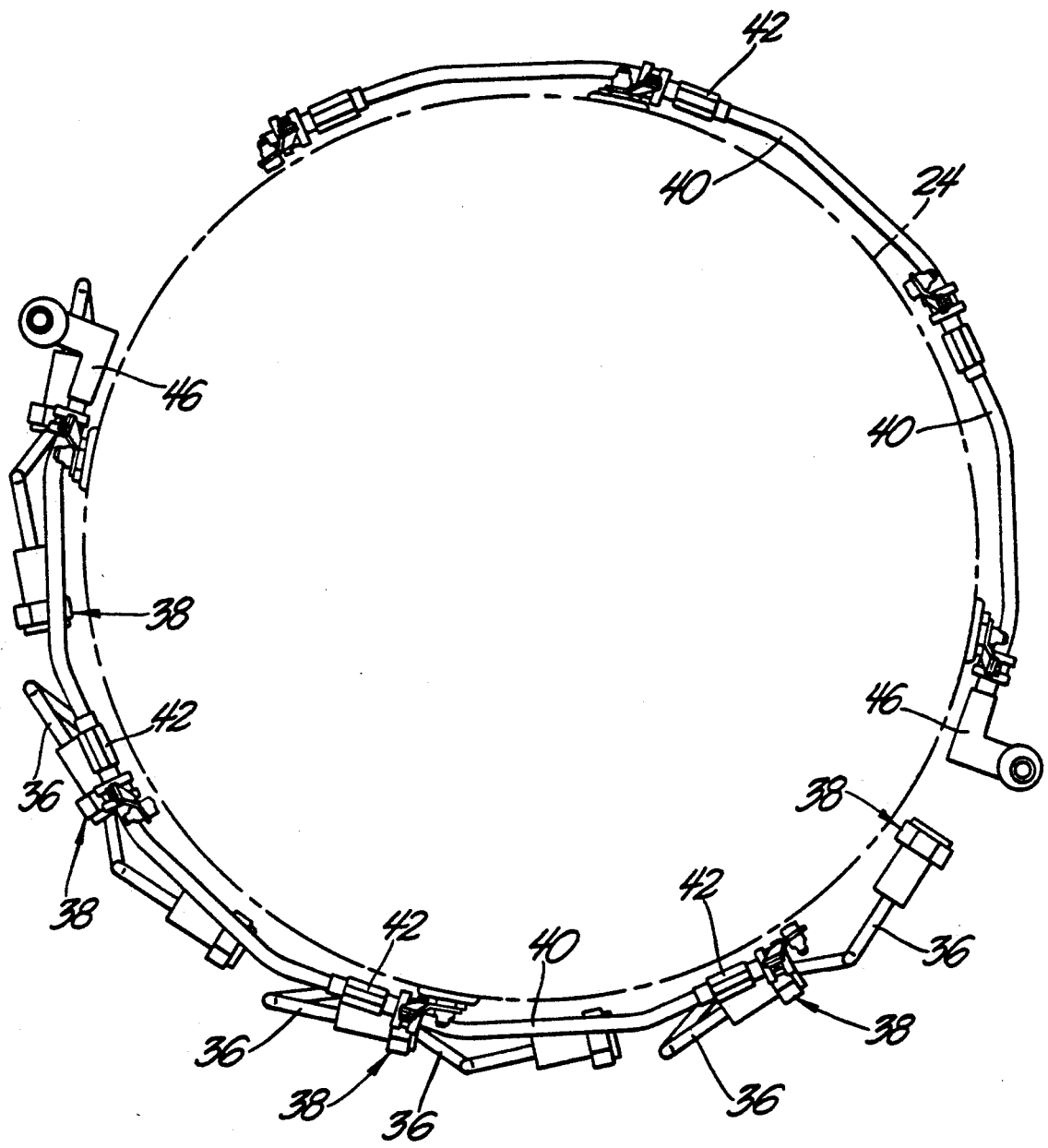
FIG. 5 is a section taken substantially along the line 5—5 of FIG. 3 looking in the direction of the arrows.
Figure 6:
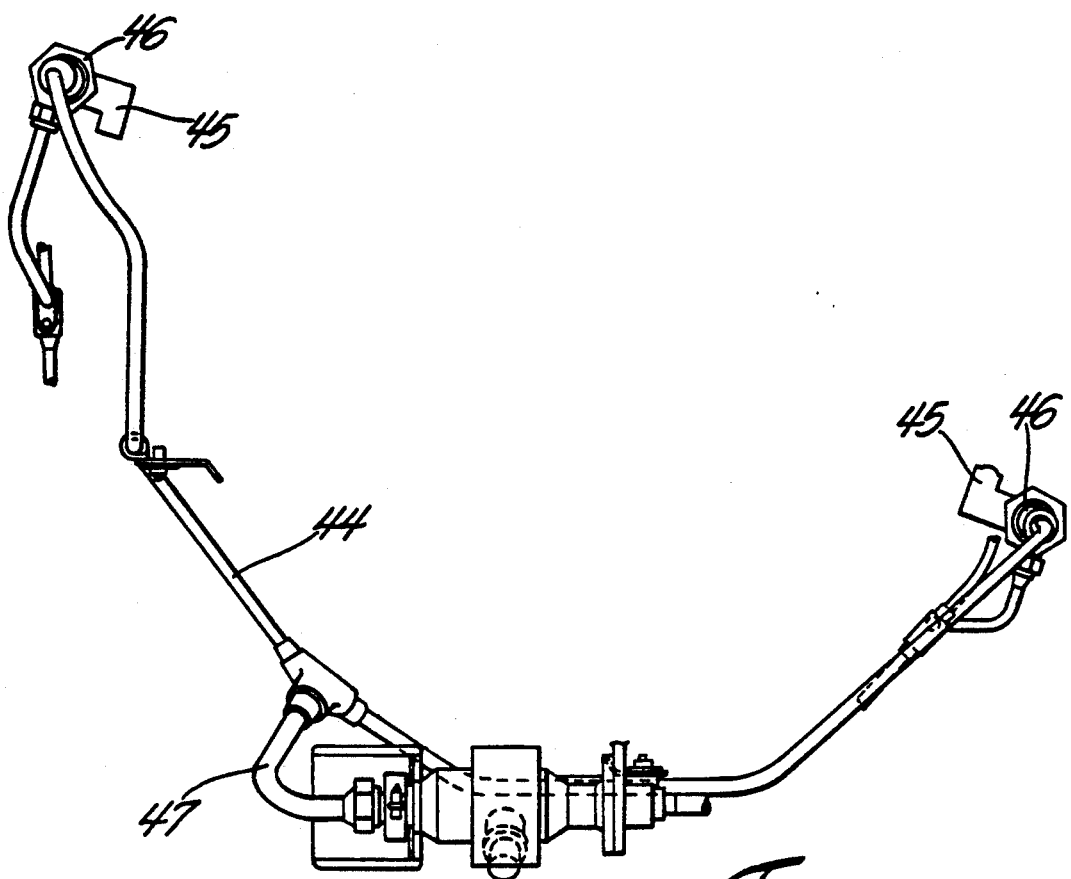
FIG. 6 is a section taken substantially along the line 6—6 of FIG. 3 looking in the direction of the arrows.

Returning to the fuel supply system 30, the fuel tubes 36 receive fuel from two, generally semicircular fuel manifolds 40 through fittings 42 or 45 that connect the fuel tubes 36 to the fuel manifolds 40 in pairs as best shown in FIGS. 2, 3 and 5. The two fuel manifolds 40 are located aft of the fuel nozzles 34. They receive fuel from a branch manifold 44 that is connected to the fuel manifolds 34 by the L-shaped fittings 43 that are attached to one end of each fuel manifold 34 as best shown in FIGS. 3 and 6. The connecting ends of the branch manifold 44 and the respective connecting ends of the L-shaped fittings 45 are disposed in two collar assemblies 46 that are part of the fuel leakage protection system 32 that is described in detail later.

Most of the branch manifold 44 is forward of the fuel nozzles 34 and it is supplied fuel by a suitably controlled fuel pump (not shown) through fuel line 47 as best shown in FIG. 6.

Figure 4:
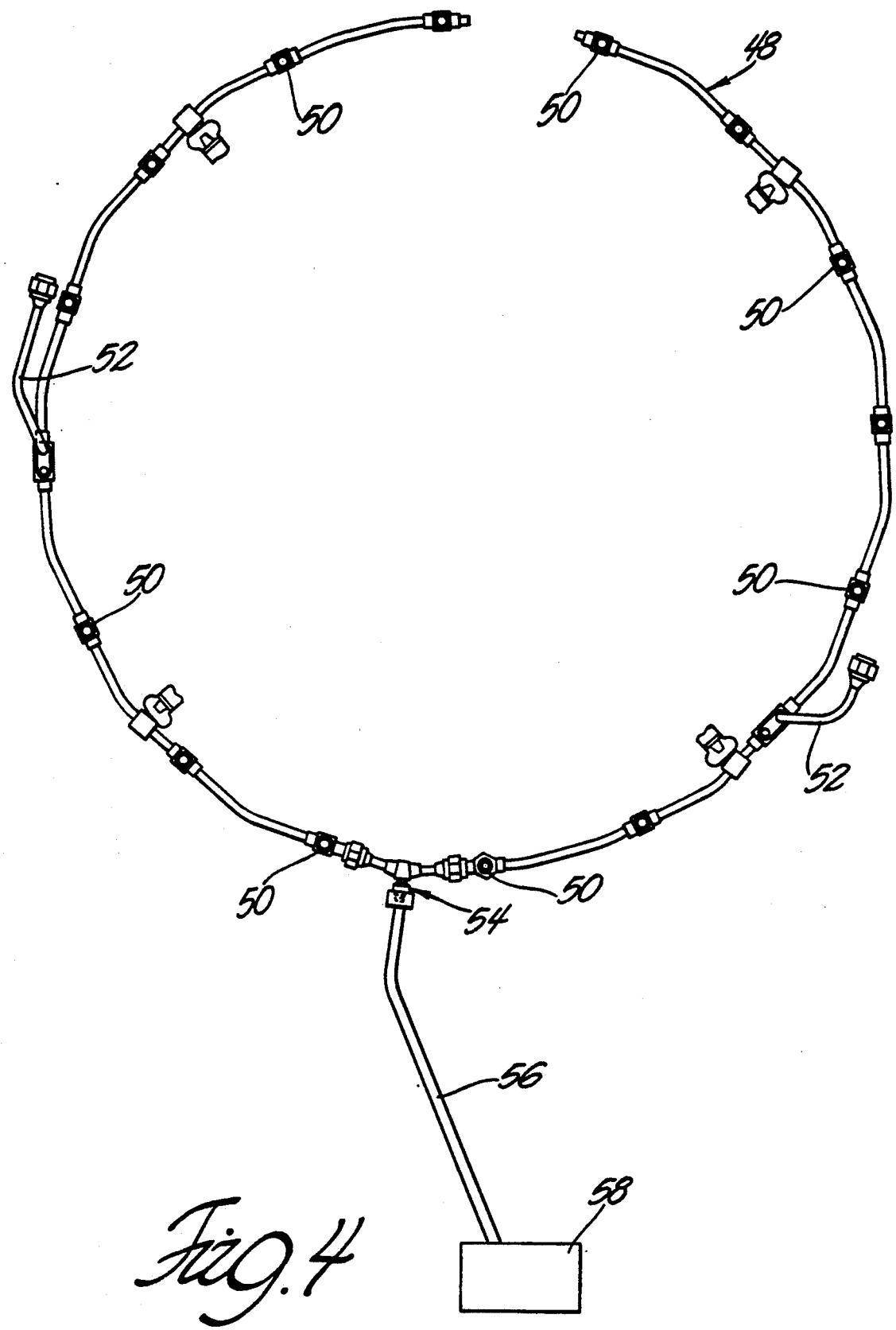
FIG. 4 is a section taken substantially along the line 4—4 of FIG. 3 looking in the direction of the arrows.

The fuel leakage protection system 32 comprises a fuel collection manifold 48 that is shown in isolation in FIG. 4 and that is located aft of the two semi-circular fuel supply manifolds 40 as best shown in FIGS. 1 and 3. The fuel collection manifold 48 collects fuel from a plurality of fuel return tubes 49 that are connected to the manifold 48 by T-fittings 50 at one end and fluidly connected to each one of the collar assemblies 38 individually at the other end. The fuel collection manifold 48 also collects fuel from two fuel return tubes 52 that are connected to the manifold 48 at one end by two of the T-fittings 50 that have double inlets and fluidly connected to each one of the collar assemblies 66 individually at the other end.

The fuel collection manifold 48 also has a Y-fitting 54 at the bottom that fluidly connects the fuel collection manifold 48 to an evacuation line 56 that leads to an collector 58 that is located away from the combustor section 24 for instance, in +he equipment bay at the front end of the engine nacelle as shown schematically in FIGS. 1, 3 and 4.

Figure 9:
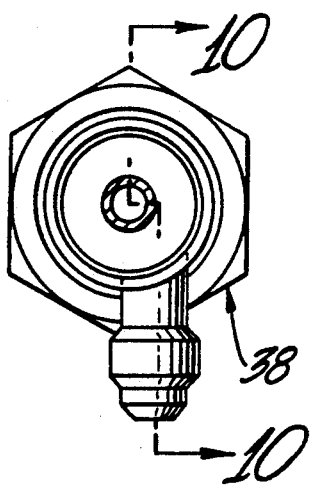
FIG. 9 is a front view of another collar assembly that is used in the fuel leakage protection system that is shown in FIGS. 1-6.
Figure 10:
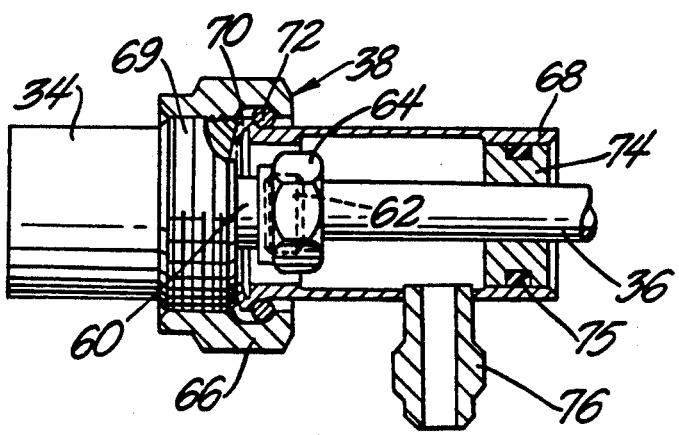
FIG. 10 is a section taken substantially along the line 10—10 of FIG. 9 looking in the direction of the arrows.

The collar assembly 38 that surrounds the end of each fuel tube 36 and the end of the nozzle 34 that it is connected to is shown in FIGS. 9 and 10. The individual fuel nozzles 34 have two dynamic beam seal fittings, i.e. fluid tight fittings on them. The first fluid tight fitting is a fuel supply fitting that is in the fuel supply system 30 and it comprises an integral protruding inlet 60 of the fuel nozzle 34 that has a threaded end 62. The threaded end 62 screws into a fitting assembly 64 that is attached to the end of the fuel tube 36. The second fluid tight fitting is part of the fuel leakage protection system 32 and it comprises a threaded collar 66 that attaches a tubular housing 68 of the collar assembly 38 to the threaded end 69 of the fuel nozzle 34. The front of the housing 68 has a resilient U-shaped flange 70. A round metal wire 72 is disposed in a cavity of the threaded collar 66 behind the flange 70 to retain the threaded collar 66 on the housing 68. The front of the resilient flange 70 biasingly engages a conical end face of the fuel nozzle 34. Consequently, the resilient flange 70 provides a self locking feature when the collar assembly 38 is installed on the fuel nozzle 38 at the required torque setting thereby eliminating any need for a safety wire.

When the collar assembly 38 is installed the fuel supply fitting 64 that attaches the end of the fuel tube 36 to the inlet 60 is inside the tubular housing 68. The back end of the housing is closed and sealed by a metal ring 74 that is brazed on the fuel tube 36. The brazed ring 74 has an annular groove that carries an elastomeric O-ring 75 that seals the interface between the ring 74 and the housing 68. Thus the fuel supply fittings 64 are encapsulated in fluid tight collar assemblies 38.

The wall of the housing 68 also carries a drain fitting 76 midway between its ends. This drain fitting 76 is connected to one of the individual fuel return tubes 49 by a suitable mating fitting on the end of the fuel return tube 49.

Figure 7:
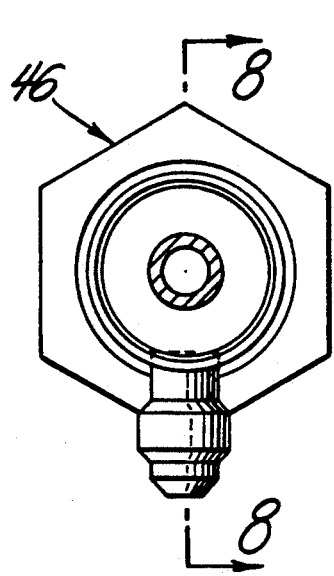
FIG. 7 is a front view of a collar assembly that is used in the fuel leakage protection system that is shown in FIGS. 1-6.
Figure 8:
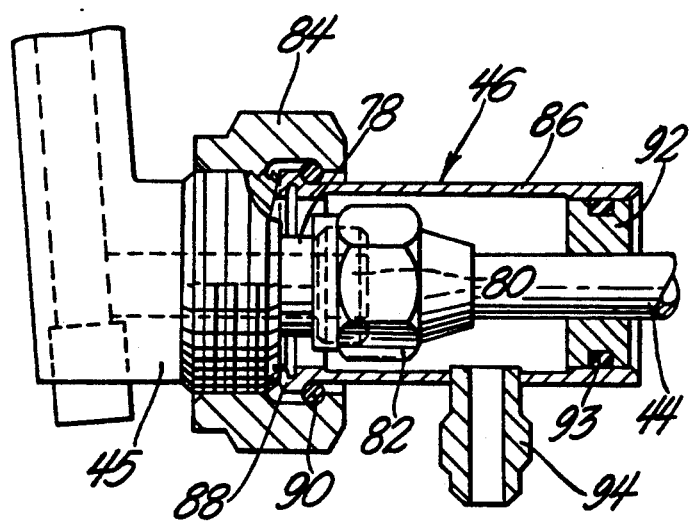
FIG. 8 is a section taken substantially along the line 8—8 of FIG. 7 looking in the direction of the arrows.

The collar assembly 46 that surrounds the connecting ends of the branch manifold 44 and the respective connecting ends of the L-shaped fittings 45 attached to the ends of the fuel manifolds 4 is shown in FIGS. 7 and 8. The individual L-shaped fittings 45 also have two dynamic beam seal fittings, i.e. fluid tight fittings on them. The first, a fuel supply fitting, comprises an integral protruding inlet 78 of the L-shaped fitting 45 that has a threaded end 80 that screws into a fitting assembly 82 that is attached to the end of the branch manifold 44. The second fluid tight fitting comprises a threaded collar 84 that attaches the housing 86 of the collar assembly 46 to the threaded end of the L-shaped fitting 45. The front of the housing 86 has a resilient U-shaped flange 88. A round metal wire 90 is disposed in a cavity of the threaded collar 84 behind the flange 88 to retain the collar 84 on the housing 86. The front of the resilient flange 88 biasingly engages a conical end face of the L-shaped fitting 45. Thus, the flange 88 provides a self locking feature when the collar assembly 46 is installed on the L-shaped fitting 45 at the required torque setting thereby eliminating any need for a safety wire.

When the collar assembly 46 is installed the fuel supply fitting 8 that attaches the end of the fuel branch 44 to the inlet 78 is inside the housing 86. The back end of the housing is closed and sealed by a metal ring 92 that is brazed on the fuel branch 44. The brazed ring 92 has an annular groove that carries an elastomeric O-ring 93 that seals the interface between the ring 92 and the housing 86. Consequently the fuel supply fittings 82 are also encapsulated in fluid tight collar assemblies 46.

The wall of the housing 86 also carries a drain fitting 94 midway between its ends. This drain fitting 94 is connected to one of the individual fuel return tubes 52 by a suitable mating fitting on the end of the fuel return tube 52.

The fuel supply fittings 64 connecting the fuel tubes 36 to the fuel nozzles 34 and the fuel supply fittings 82 connecting the fuel supply manifold 44 to the branch manifolds 40 are closest to the hottest section of the combustor section 24, which of course, is at the location where the tips of the fuel nozzles 34 deliver the fuel into the combustor. This can be best observed from FIGS. 1, 2 and 3.

Fuel is delivered through the fuel supply system 30 under high pressure and consequently fuel leakage, if any is likely to occur at the fuel supply fittings first. This possibility of fuel leakage at these particular fuel supply fittings at locations in proximity to the hottest section of the combustor is addressed by the fuel leakage protection system of this invention.

The fuel leakage protection system of this invention operates as follows. Any fuel leakage of the fuel supply system 30 at the fuel supply fittings 64 and 82 is trapped in an associated collar assembly 38 or 46. The leakage fuel is then collected in the manifold 48 via the fuel return tubes 49 and 52. The collected leakage fuel is then evacuated to a collector 58 at a relatively cool remote location through fitting 54 and evacuation line 56. Once in the collector 58, the leakage fuel can be disposed of after the aircraft lands.

Thus the fuel leakage protection system of the invention protects against fuel leaking onto the hot combustor section of the gas turbine engine.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A fuel leakage protection system (32) for a gas turbine engine (12) having a fuel system (30) that has a plurality of circumferentially spaced fuel nozzles (34) that are equally circumferentially spaced around a combustor section (24) of a gas turbine engine, a plurality of fuel tubes (36) having ends that are connected to the fuel nozzles by fuel supply fittings (62, 64) for delivering fuel to the fuel nozzles (34) individually, a pair of generally semi-circular fuel manifolds (40) that are located aft of the fuel nozzles (34) and that are connected to the fuel tubes (36) for delivering fuel to the fuel tubes (36), each of the fuel manifolds having an L-shaped fitting (45) having ends at one end, and a branch manifold (44) having ends that is connected to the L-shaped fittings (45) of the fuel manifolds (40) by fuel supply fittings (80, 82) having ends for delivering fuel to the fuel manifolds (40) via the L-shaped fittings (45), comprising:

collar assemblies (38) encapsulating respective fuel supply fittings (62, 64) connecting the end of each fuel tube (36) and a respective end of its associated fuel nozzle (34) for trapping any leakage fuel from the fuel supply fittings, collar assemblies (46) encapsulating respective fuel supply fittings (80, 82) connecting the ends of the branch manifold (44) and the respective connecting ends of the L-shaped fittings (45) for trapping any leakage fuel from the fuel supply fittings, a fuel collection manifold (48) that is located aft of the two semi-circular fuel supply manifolds (40);

the fuel collection manifold (48) collecting leakage fuel from the collar assemblies (38) via a plurality of fuel return tubes (49) that are connected to the manifold (48) by T-fittings (50) at one end and fluidly connected to each one of the collar assemblies (38) individually at the other end;

the fuel collection manifold (48) also collecting leakage fuel from the collar assemblies (46) via a plurality of fuel return tubes (52) having ends that are connected to the manifold (48) at one end by two of the T-fittings (50) that have double inlets and fluidly connected to each one of the collar assemblies (46) individually at the other end; and the fuel collection manifold (48) also having a Y-fitting (54) at the bottom that fluidly connects the fuel collection manifold (48) to an evacuation line (56) that leads to a collector (58) that is located further aft of the combustor section (24).

2. The fuel leakage protection system as defined in claim 1 wherein:

the fuel supply fittings connecting the fuel tubes (36) to the fuel nozzles (34) comprise male threaded connectors (62) of the fuel nozzles (34) that are screwed into fitting assemblies (64) that are attached to the ends of the fuel tubes (36), and the collar assemblies (38) that encapsulate the fuel supply fittings comprise threaded collars (66) that attach tubular housings (68) to a threaded end of each of of the fuel nozzles (34), the fronts of the housings (68) having resilient U-shaped flanges (70) engaging end faces of the fuel nozzles (34), the resilient flange (70) providing a self locking feature when the collar assemblies (38) are installed on the fuel nozzles (34) at a required torque setting thereby eliminating any need for a safety wire, the housings of the collar assemblies (38) having back ends that are closed and sealed by metal rings (74) that are brazed on the fuel tubes (36) and that have annular grooves that carry elastomeric O-rings (75) that seal the interfaces between the rings (75) and the housings (68), and the housings (68) having drain fittings (76) midway between their ends that are connected to the fuel return tubes (49).

3. The fuel leakage protection system as defined in claim 1 wherein:

the fuel supply fittings connecting ends of the branch manifold (44) to the L-shaped fittings 45 comprise male threaded connectors (80) of the L-shaped fittings (45) that are screwed into fitting assemblies (82) that are attached to the ends of the branch manifold (44), and the collar assemblies (46) that encapsulate the fuel supply fittings comprise threaded collars (84) that attach tubular housings (86) having ends to a threaded end of each of of the L-shaped fittings (45), the fronts of the housings (86) having resilient U-shaped flanges (88) engaging end faces of the L-shaped fittings (45), the resilient flange (88) providing a self locking feature when the collar assemblies (46) are installed on the L-shaped fittings (45) at a required torque setting thereby eliminating any need for a safety wire, the housings of the collar assemblies (46) having back ends that are closed and sealed by metal rings (92) that are brazed on the fuel branch (44) and that have annular grooves that carry elastomeric O-rings (92) that seal the interfaces between the rings (93) and the housings (86), and the housings (86) having drain fittings (94) midway between their ends that are connected to the fuel return tubes (52).

4. A collar assembly (38) for encapsulating a fuel supply fitting for attaching a fuel tube (36) to a fuel supply device (34) comprising;

a tubular housing (68) having a threaded collar (66) at one end for attaching the tubular housing (68) to a threaded end of the fuel supply device (34), the housing (68) having a resilient U-shaped flange (70) at the one end for engaging an end face of the fuel supply device (34), the resilient flange (70) providing a self locking feature when the collar assembly (38) is installed on the fuel supply device (34) at a required torque setting thereby eliminating any need for a safety wire, the housing (68) of the collar assembly (38) having an opposite end that is closed and sealed by a metal ring (74) that is brazed on the fuel tube (36) and that has an annular groove that carries an elastomeric O-ring (75) that seals an interface between the ring (74) and the opposite end of the housing (68), and the housing (68) having a drain fitting (76) between its ends.

* * * * *